United States Patent

Markow

[15] 3,646,255

[45] Feb. 29, 1972

[54] FACSIMILE SYSTEM

[72] Inventor: Elliott W. Markow, Burlington, Mass.

[73] Assignee: Newton Electronic Systems, Inc., Waltham, Mass.

[22] Filed: Feb. 20, 1970

[21] Appl. No.: 13,087

[52] U.S. Cl. ..........178/6

[51] Int. Cl. ..........H04n 3/30, H04n 7/12

[58] Field of Search ..........178/DIG. 3, 6, 6.8

[56] References Cited

UNITED STATES PATENTS

| | | | |
|---|---|---|---|
| 3,286,026 | 11/1966 | Greutman et al. | 178/DIG. 3 |
| 3,384,710 | 5/1968 | Doundoulakis | 178/DIG. 3 |
| 3,428,744 | 2/1969 | Green et al. | 178/DIG. 3 |
| 3,445,598 | 5/1969 | Green et al. | 178/DIG. 3 |

*Primary Examiner*—Robert L. Griffin
*Assistant Examiner*—Barry Leibowitz
*Attorney*—Rich & Ericson

[57] ABSTRACT

An electronic facsimile system comprising a transmitter including a document scanner, actuated by two deflection signals, one of which is held fixed while the other is scanned over the copy at a fast rate until data is encountered. When data is encountered, the scanning signal drops back and begins a slow scan until no further data has been found for a predetermined time. In the receiver, a recorder is operated in accordance with two corresponding deflection signals, one of which is fixed, while the second is scanned in time with the transmitter scan. In both transmitter and receiver, the deflection signal that is fixed while the other is scanned is stepped to the next position at the end of the scan, which is reached at a time dependent on the data content of the copy being transmitted and received.

8 Claims, 6 Drawing Figures

Inventor
ELLIOTT W MARKOW
By Rich & Ericson
Attorneys

Patented Feb. 29, 1972

3,646,255

6 Sheets-Sheet 2

Inventor
ELLIOTT W. MARKOW
by Rich & Ericson
Attorneys

INVENTOR
ELLIOTT W. MARKOW
BY Rich & Ericson
ATTORNEYS

Inventor
ELLIOTT W MARKOW
by Rich & Ericson
Attorneys

INVENTOR
ELLIOTT W MARKOW
BY Rich & Ericson
ATTORNEYS

Patented Feb. 29, 1972

3,646,255

6 Sheets-Sheet 6

INVENTOR
ELLIOTT W. MARKOW
BY Rich & Ericson
ATTORNEYS

FACSIMILE SYSTEM

My invention relates to facsimile systems, and particularly to a novel electronic facsimile system.

Historically, facsimile equipment has been organized about the concept of a shaft rotating at a fixed speed in the transmitter, and synchronized with a corresponding shaft in the receiver. The shafts may be associated with drums on which the copy and the record sheet on which the copy is to be reproduced are disposed, adjacent transducer heads. The transducer heads at the transmitter and receiver are set to corresponding axial positions on the drum, and transmission and reception takes place as the drum revolves with the heads in fixed position. The heads are then stepped axially along the drums to the next line position for transmission and reception.

It has long been recognized that much of the copy that it is desired to transmit by facsimile contains far less information than could be transmitted in the time required to scan and reproduce data on each scanned line of the document. For example, on a typewritten page, a line of type is commonly separated by a line or two of no information before the next line of type is encountered. Since, for each such line of type, numerous scans are normally made to get adequate resolution, typically a large number of scans would be occupied in simply going over white space without transmitting any information. Accordingly, numerous systems have been proposed for speeding up facsimile transmission time by skipping blank areas on documents. For example, U.S. Pat. No. 3,428,744 to Green et al., issued on Feb. 18, 1969 for Facsimile Line Skipping System, shows such a mechanical system in which each line on a document to be transmitted is prescanned, and the transducing heads then advanced without waiting for the drum to revolve unless information was encountered in the prescan. Such a system is limited in the savings that it can effect by reason of the necessity to keep the basic timing shafts in transmitter and receiving moving at constant speed and in synchronism. The limitation is that one line of information can only be transmitted at a fixed duration after the last line has been transmitted, which fixed duration equals the time required to record a full line of data. In other words, while the last line position axially of the drum can be advanced at any time, it is only at a particular shaft angle that recording on the revolving receiver drum can be started. Since synchronization depends upon keeping the drums rotating at constant speed, the interval between such shaft angles is fixed.

Another approach to the facsimile problem is illustrated by my copending U.S. application Ser. No. 797,865, filed on Feb. 10, 1969, for Facsimile System and assigned to the assignee of this application. In accordance with the disclosure of that application, a facsimile system includes electronic apparatus for both producing video signals from copy to be transmitted and for reproducing copy from the video signals so produced. The electronic scanning means is controlled by two deflection signals, which together serve to locate a sensing element such as a spot of light or an electron beam. In the transmitter, the sensing element controls a video signal generator. In the receiver, the sensing element is controlled by the received video signal, and marks a record sheet, such as a photosensitive, heat-sensitive, or electrosensitive record sheet. One of the deflection signals corresponds to line position on the copy, and is held fixed while the other deflection signal scans the copy. While the first signal is fixed, the second signal is first rapidly scanned over the copy, and stores a sequence of signals indicating the presence or absence of data in several segments of the line being scanned. That stored data is then transmitted to the receiver, where it serves to program the receiver in response to the following operation, which is a second scan at the same line position at a rate determined by whether or not there was data in the several segments. In that system, the interval between lines that can be recorded is not fixed, but depends on the data content of the copy. Synchronization of the receiver is accomplished by the transmitter with the aid of transmitted signals at the same frequency as the video data signals. However, for optimum utilization, storage must be provided at the receiver and transmitter, and time must be made available to transmit the contents of the transmitter register to the receiver register. The object of my present invention is to simplify the amount of apparatus required in a facsimile system, while improving the efficiency and reducing the time required for data transmission.

Briefly, the above and other objects of my invention are attained by a facsimile system in which electronic transducers are employed in both transmitter and receiver which include two electronic deflection signals to locate the transducer on the copy. For simplicity, and to illustrate the preferred embodiment, these transducers will be described as a flying spot scanner in the transmitter, and a flying spot recorder in the receiver. However, as will be apparent to those skilled in the art, other transducers utilizing similar deflection signals, such as a laser scanner or the like, can be employed if so desired.

Referring, then to the exemplary and preferred embodiment, the flying spot scanner in the transmitter comprises a cathode-ray tube having provision for a pair of deflection signals, such as a vertical signal to locate the vertical line position on a document to be scanned, and a horizontal deflection signal to control the position of the beam along the line selected by the vertical signal. Timing of the deflection signals is under the control of synchronized oscillators in the transmitter and the receiver. Switching apparatus is provided for dividing the operating time of the transmitted into two cycles. First prior to each line there is a synchronizing interval in which a number of oscillator pulses are applied to the transmission line to aid in synchronizing the receiver. Next, with the vertical deflection signal set at some line position, the horizontal deflection signal is varied to scan the selected line on the copy, initially at a high rate. A video detection circuit is provided that responds to variations in reflectivity in the copy to produce a video data signal when information is encountered on the line being scanned. When information is encountered, the horizontal deflection signal generator is adjusted to retrace to a point before that at which data was encountered, and then begin scanning again at a lower rate.

During the interval in which the horizontal signal is scanning rapidly, the video signal from the scanner is processed and applied to the transmission line, so that any video detected will similarly affect the receiver. If a video data signal is produced during the rapid scan, the receiver will also retrace, and begin a slow horizontal scan in the flying spot recorder. Once begun, a slow scan will continue until the maximum horizontal deflection voltage, corresponding to the end of line, has been reached, or until a predetermined time has elapsed after the last video data has been detected, as determined by counters in the transmitter and receiver that begin to count when the video signal is first detected. These counters are arranged to be reset each time new video data signals are detected during the slow scan, so that unless the end of the line is reached sooner, slow scan will continue until at least the predetermined time determined by the counters has elapsed without receiving new video data signals.

When the end of the horizontal scanning line is reached, either during the rapid scan or a slow scan or after a combination of both modes of scanning, the vertical deflection signals will automatically be stepped to go to the next line. Operation will continue in this manner until the end of the last line to be scanned, whereupon the apparatus will be reset by operation of the vertical deflection signal generator.

Preferably, apparatus is provided for initially synchronizing the transmitter and receiver, supplementing the operation of the synchronizing signals produced between each line scanned. One major advantage of the apparatus is that slight discrepancies in alignment of the copy in the flying spot scanner will not result in loss of efficiency. In prior facsimile apparatus of the kind in which fast and slow scanning is employed, such misalignment may result in interpreting a document that has relatively little copy as one that is replete with information. For example, a typewritten document, in which lines of type are interspersed by white spaces, if aligned at a slight angle to the scanner, can appear to be one in which there is information in each line scanned. With the apparatus of my invention, even relatively short intervals in which no video data is generated are rapidly skipped over.

The manner in which the apparatus of my invention is constructed, and its mode of operation, will best be understood in the light of the following detailed description, together with the accompanying drawings, of a preferred embodiment thereof.

Figure 1:
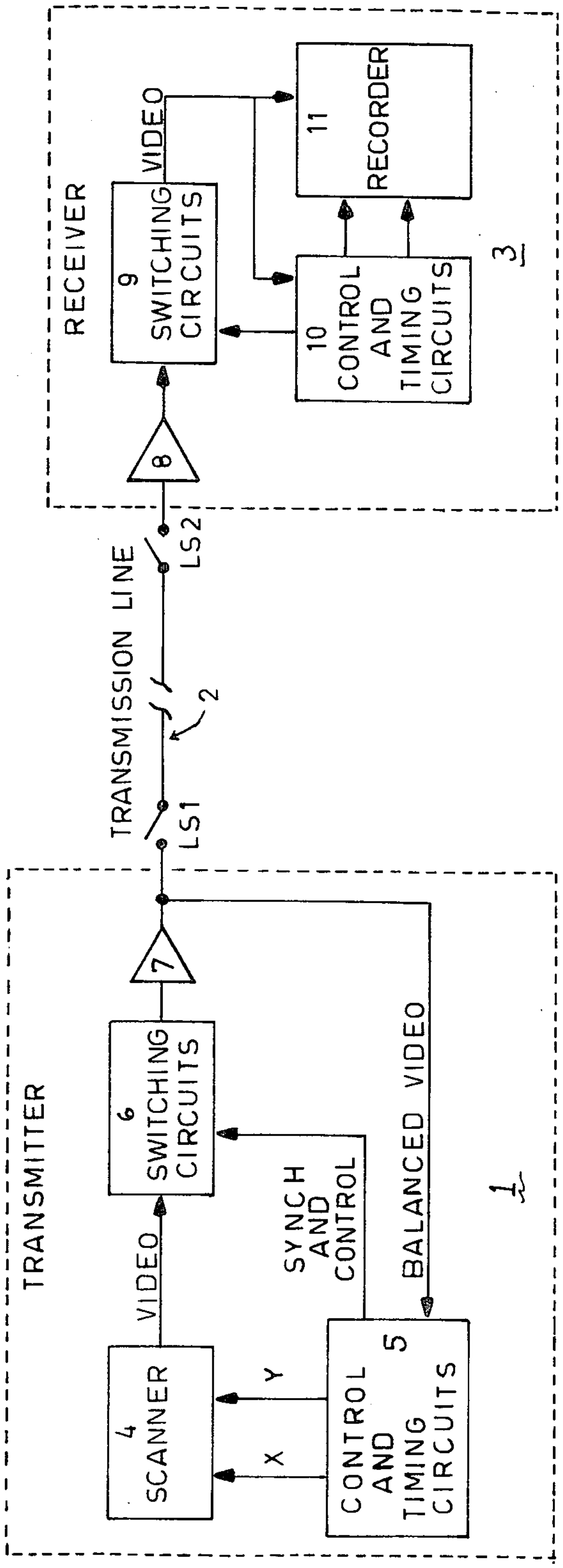
FIG. 1 is a schematic block diagram of a facsimile system in accordance with my invention.

Referring to the drawings, FIG. 1 shows a facsimile system comprising a transmitter 1 adapted to be connected over a transmission line generally designated 2 to a receiver 3. The transmission line 2 may comprise a conventional telephone line, arranged for interconnection to the stations corresponding to the transmitter and receiver by electronic switching means conventionally designated as line switches LS1 and LS2.

The transmitter 1 comprises a document scanner 4, such as a flying spot scanner, an orthicon or vidicon tube, a laser scanner, or the like, responsive to applied line position and line scanning signals to scan a document and produce a video signal in accordance with the data recorded on the document being scanned. The line position and line scan signals, such as the vertical and horizontal deflection signals Y and X for a cathode-ray tube, are provided by control and timing circuits generally designated 5. The control and timing circuits 5 respond to the video data under the control of internal timing circuits, to actuate switching circuits 6 that selectively apply either the video data from the scanner 4, or synchronizing and control signals from the circuits 5, to a signal-conditioning circuit 7 that produces balanced signals for application to the line 2. The video signal, and the signals from the synchronizing and timing circuits are preferably applied by the switching circuits 6 to the circuit 7 in the form of digital pulses. The circuit 7 may be any conventional apparatus for modulating a transmission line, but is preferably a tone burst generator of the type shown and described in my copending U.S. application Ser. No. 858,413 filed on Sept. 16, 1969 for Tone Burst Generator, and assigned to the assignee of this application. The apparatus serves to produce an equal number of positive and negative going half cycles, namely balanced pulses of alternating current, at a fixed frequency, in response to each applied pulse input. Specifically, the signals from the synchronizing and timing circuits are pulses of short duration relative to the period of the signals produced by the amplifier 7, and each such pulse input produces a single full cycle of alternating current for application to the line. The video data signals from the scanner are unipolar pulses of varying duration, depending on the copy, and cause the signal condition 7 to produce a train of equal numbers of positive and negative half cycles including one or many full cycles, depending on the duration of the pulse input.

The receiver comprises an amplifier and limiter 8 which includes circuits receptive to signals produced by the transmitter. The transmitter slow transmission rate may, for example, be the equivalent of 3,000 cycles per second. The amplifier and limiter 8 also include conventional circuits for producing a digital pulse in response to each full cycle of current received at the transmitted frequency. It should be noted that tuned circuits are not required, and in fact would interfere with the operation of the system because of their inherent response time.

The output signals from the amplifier and limiter 8 are applied to switching circuits 9 that interact with control and timing circuits 10 to apply video, line position and line scan signals to a recorder 11, such as a flying spot recorder, or the like. In the recorder, a record sheet, such as a sheet of photosensitive paper or the like, is marked by a moving spot of light modulated by the video signal, and controlled in position by the line position and line scan signals in synchronism with the transmitter scanner, to reproduce the document under transmission.

Figure 2:
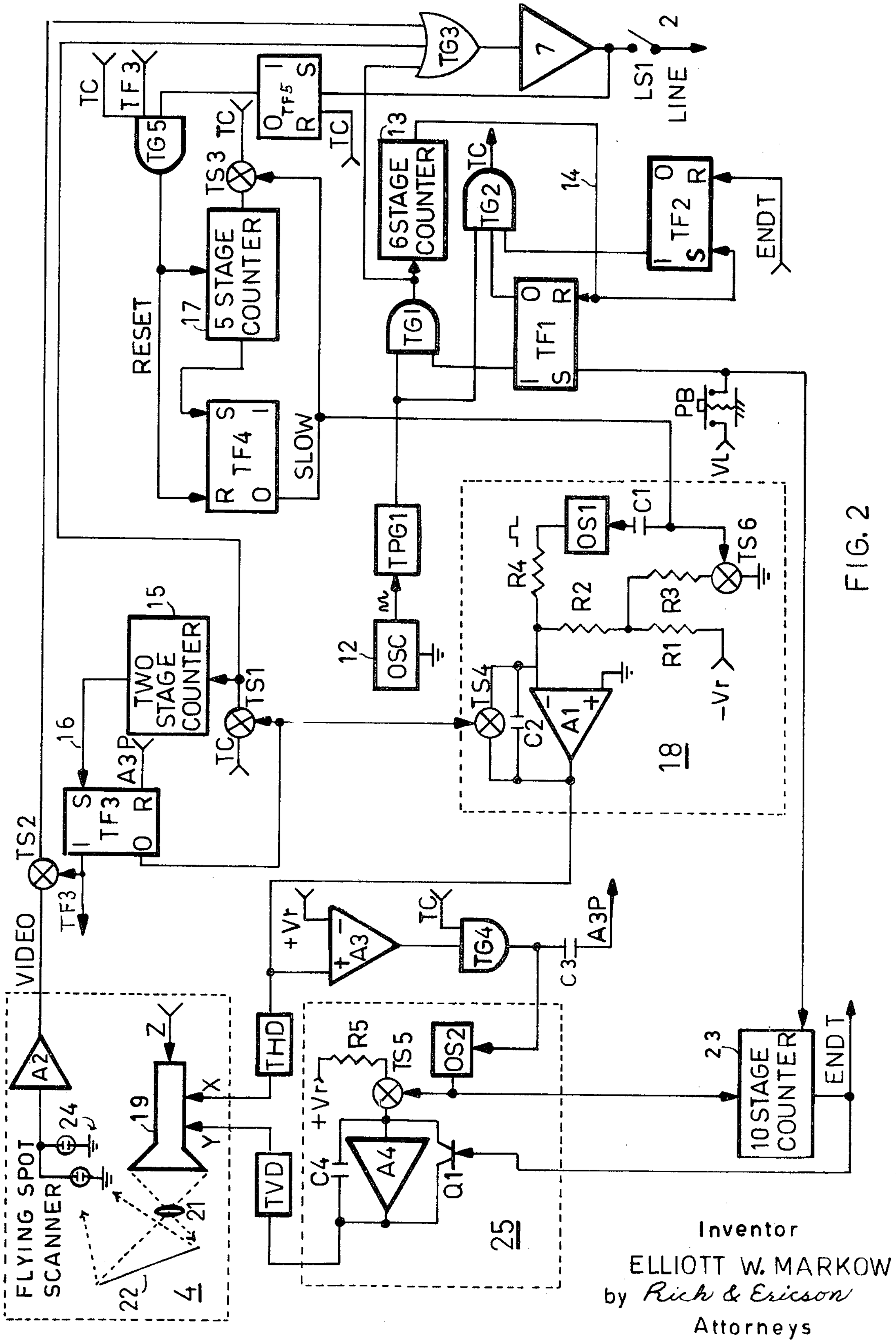
FIG. 2 is a schematic wiring diagram of a transmitter forming a part of the apparatus of FIG. 1.

Referring to FIG. 2, the transistor comprises a clock oscillator 12, of any conventional construction. The oscillator is adapted to produce a fixed frequency output signal, of, for example, 3,000 cycles per second. The output signal from the oscillator 12 is applied to a conventional pulse generator TPG2, which serves to produce a clock pulse at the trailing edge of each cycle of the oscillator signal.

The pulses from pulse generator TPG1 are applied to one input terminal of a conventional AND-gate TG1. The pulses from the pulse generator TPG1 are also applied to one input terminal of a second AND-gate TG2.

A second input terminal of the AND-gate TG1 is connected to the logic 1 output terminal of a flip-flop TF1. The flip-flop TF1 enables the gate TG1 to pass pulses from the pulse generator TPG1 when the flip-flop is in its set state.

When pulses are produced by the gate TG1, they are applied to the line 2 through an OR-gate TG3 and the modulating amplifier 7. As will appear, pulses applied to the line through this circuit are used to synchronize the receiver at the beginning of a page transmission.

The output terminal of the gate TG1 is also connected to the input terminal of a six-stage counter 13. The counter 13 may be any conventional circuit for producing an output pulse for each 64 applied input pulses. Output pulse produced by the counter are applied over a lead 14 to the reset input terminal of the flip-flop TF1, and to the set input terminal of a second flip-flop TF2.

The flip-flop TF1 is arranged o bet set at the beginning of a transmission period by momentarily depressing a pushbutton PB to apply a suitable voltage input signal $V_L$ to the set input terminal of the flip-flop. The same signal serves to reset a 10-stage counter 23, for purposes to be described.

The logic zero output of the flip-flop TF1, and the logic one output of the flip-flop TF2, are connected to second and third input terminals of the AND-gate TG2. With that arrangement, when the flip-flop 1 is reset and the flip-flop 2 is set, the gate TG2 passes pulses from the pulse generator TPG1. These gated clock pulses, labeled TC, serve as transmitter clock pulses to start and maintain operation of the transmitter after initial synchronization has been achieved.

The apparatus thus far described comprises a start sequence generator that applies a train of 64 clock cycles to the line 2 when the pushbutton PB is momentarily depressed, and thereafter supplies timing pulses TC to the apparatus shown elsewhere in FIG. 2.

Prior to each transmitter line scan, four clock pulses TC are applied to the OR-gate TG3 through a conventional electronic switch TS1. The switch TS1, as well as other electronic switches similarly designated, may be any conventional electronic switch, such as a transistor or the like, arranged to be closed when a logic 1 input signal is applied to its control terminal, identified by an arrowhead. Thus, the switch TS1 is closed when a flip-flop TF3 is in its reset state, and has a logic 1 signal appearing at its logic zero output terminal that is connected to the control terminal of the switch.

Clock pulses TC that are passed by the switch TS1 when it is closed are applied to a two stage counter 15. The counter 15 produces an output pulse on a lead 16 at each fourth clock pulse TC applied to its input terminal. When a pulse appears on the lead 16, it sets the flip-flop TF3 to open the switch TS1. The flip-flop TF3 is arranged to be reset by a pulse A3P that is produced in a manner to be described at the end of each horizontal scan.

The logic 1 output terminal of the flip-flop TF3 is connected to an electronic switch TS2 to close it when the flip-flop TF3 is set. When closed, the switch TS2 admits video data signals from the flying spot scanner 4 to the OR-gate TG3, and thence to the signal-processing amplifier 7. Output signals produced by the amplifier 7 are applied to the line 2, and also to the set input terminal of a flip-flop TF5. The reset input terminal of the flip-flop TF5 receives the transmitter clock pulses TC.

The logic one output terminal of the flip-flop TF5 is connected to one input terminal of an AND-gate TG5. The gate TG5 has a second input terminal to enable the gate when the flip-flop TF3 is set, and have a third input terminal which receives the clock pulses TC. The gate TG5 serves to time horizontal scanning in the transmitter in a manner to be described.

The counter 17 is at time stepped by clock pulses TC admitted through an electronic switch TS3. The switch TS3 is arranged to be closed by a flip-flop TF4 when it is in its reset state. When 32 clock pulses TC have been admitted to the counter 17 through the switch TS3, the counter will produce an output pulse that will set the flip-flop TF4, and thereby open the switch TS3. During the period when the switch TS3 is closed, and the current 17 is being stepped, should a video pulse be supplied through the switch TS2, the amplifier 7 will supply a signal to the line 2 and the flip-flop TF5. The gate TG5 is enabled by the flip-flops TF3 and TF5 in their set states. The flip-flop TF3 is set when the switch TS2 is closed. The output from the gate TG5 will reset the counter, and the latter will begin to count again. Thus, the flip-flop TF4 will be set at the end of 32 clock pulses TC following its resetting by a video pulse only if no video pulse appears during the counter stepping operation.

The logic zero output of the flip-flop TF4 is also connected to the control terminal of an electronic switch TS6, and, through a capacitor C1, to the trigger input terminal of a conventional one-shot multivibrator OS1.

The switch TS6 and the one-shot multivibrator OS1 comprise part of a variable speed horizontal sweep generator generally designated 18. The sweep generator 18 further comprises an operational amplifier A1. The amplifier A1 has its noninverting input terminal grounded, and its inverting terminal connected to its active output terminal through an integrating capacitor C2. An electronic switch TS4 is connected across the capacitor C2. When the switches TS4 and TS6 are both open, the amplifier A1 produces a ramp signal rising at a relatively high rate, in response to an input voltage $-V_r$ applied through two resistors R1 and R2 in series to the inverting terminal of the amplifier. Assuming that the full scanning voltage, reached at the output terminal of the amplifier A1 at the end of a horizontal scan, is 10 volts, the rate of rise of the ramp signal with the switch TS6 open may, for example, be 1,280 volts per second.

The switch TS6 is connected in series with a resistor R3 between the junction of the resistors R1 and R2 and ground. When closed, the switch TS6 thus reduces the voltage applied to the amplifier A1, and causes the amplifier to produce a ramp signal rising at a slower rate of, for example, for example, 33 volts per second.

When the flip-flop TF4 is reset, the switch TS6 is closed, and the one-shot multivibrator OS1 is triggered to produce a positive output signal. That signal is applied through a resistor R4 to the input terminal of the amplifier A1. The output voltage of the one-shot multivibrator OS1 is selected to oppose the voltage applied from the reference source $-V_4$, and thereby provided a retrogression or retrace. By that arrangement, when the sweep generator 18 is set from the fast scan mode to the slow scan mode by closing the switch TS6, the output voltage of the amplifier A1 is initially retrogressed so that the slow starts just behind the point where the fast scan stopped. The purpose of that mode of operation is to go back and retrieve the data which initiated the slow scan, as will appear.

When the switch TS4 is closed, the output of the amplifier A1 is held at ground potential. As shown, the control terminal of the switch TS4 is connected to the logic zero output terminal of the flip-flop TF3, so that it will be closed while the flip-flop TF3 is in its reset state.

The output voltage from the horizontal sweep generator 18 is applied through conventional horizontal deflection circuits THD to provide one deflection signal X for a cathode-ray tube 19 forming a part of the flying spot scanner 4. As is conventional, the cathode-ray tube 19 is arranged to receive a vertical deflection signal Y, and an intensity control signal Z. The intensity signal is preferably constant, for purposes of my invention, and may be produced in any conventional manner.

The flying spot scanner 4 operates in the conventional manner well known in the art. The spot of light appearing on the screen of the cathode-ray tube 19, in a position determined by the deflection voltages X and Y, is focused by a lens 21 onto copy in recording position, as indicated at 22.

Light reflected from the copy 22 is reflected onto photodetectors 24. The photodetectors 24 are connected in parallel to the input of a conventional video amplifier and detector A2. While the amplifier and detector A2 may be of any conventional construction, it preferably comprises a video detection circuit of the type shown and described in my copending application Ser. No. 838,681, filed on June 14, 1969 for Video Detection Circuit and assigned to the assignee of this application.

The vertical deflection signal Y required by the flying spot scanner 4 is supplied through conventional vertical deflection circuits TVD in response to a control signal provided by a vertical sweep generator generally designated 25. Generally speaking, the sweep generator 25 comprises an integrator that is provided with a pulse of fixed amplitude and duration each time it is desired to step to a new vertical line position.

Line stepping pulses are provided at the end of each horizontal scan by means of a comparator comprising an operational amplifier A3. The amplifier A3 may comprise any conventional operation amplifier having its inverting input terminal connected to a source of reference potential $+V_r$, and its noninverting input terminal connected to the output terminal of the horizontal sweep generator 18.

It will be apparent that with the horizontal sweep voltage at ground, the output of the amplifier A3 will be negative. As the horizontal sweep voltage rises, the output voltage of the amplifier A3 will go toward ground, and, at the end of the sweep, become positive. The output terminal of the amplifier A3 is connected to one input terminal of an AND-gate TG4. The second input terminal of the gate TG4 receives the transmitter clock pulses TC. When, at the end of the sweep, the amplifier goes positive and enables the gate TG4, the next clock pulse TC will produce an output signal that triggers the one-shot multivibrator OS2 in the sweep generator 25. The same signal is applied through a capacitor C3 to produce the pulse A3P that resets the flip-flop TF3.

The sweep generator 25 comprises an operational amplifier A4 having a feedback capacitor C4 and an input circuit extending from a terminal at the reference voltage $+V_r$ through a resistor R5 in series with an electronic switch TS5. When the oscillator OS2 is triggered, it closes the switch TS5 for a predetermined period, admitting current to the input terminal of the amplifier A4 and thereby causing the amplifier to charge the capacitor C4. Each such pulse applied to the amplifier A4 causes its output voltage to rise by one line increment. Thus, for example, it may be desired to scan the record 22 in 1,024 lines. For that purpose, the input voltage steps applied to the amplifier A4 are selected to create output voltages increments each 1/1,024 times the full vertical sweep voltage.

Each output pulse from the one-shot OS2 steps a 10-stage counter 23. The counter 23 may be of any conventional construction adapted to produce one output signal, labeled ENDT, for each 1,024 applied input pulses. As will appear, the signal ENDT serves to reset the flip-flop TF2, and to discharge the capacitor C4, at the end of each page transmission.

The output terminal of the amplifier A4 is connected to the vertical deflection circuits TVD.

An electronic switch Q1, preferably a field-effect transistor, has its load terminals connected across the capacitor C4, so that when the transistor Q1 is rendered conducting by a positive signal, namely, the signal ENDT, applied to its gate with respect to ground, the capacitor C4 is discharged to restore the vertical deflection position to zero.

It will be apparent that in the absence of a pulse from the counter 23, the gate of the transistor Q1 will be reverse biased, and the transistor will be cut off. When the counter 23 produces an output pulse, the transistor Q1 will be forward biased for a sufficient time to discharge the capacitor C4.

The positive signal produced by the counter 23, labeled ENDT, is also used to reset the flip-flop TF2 in the start sequence generating circuit, and thereby restore the apparatus to its initial condition.

Figure 3:
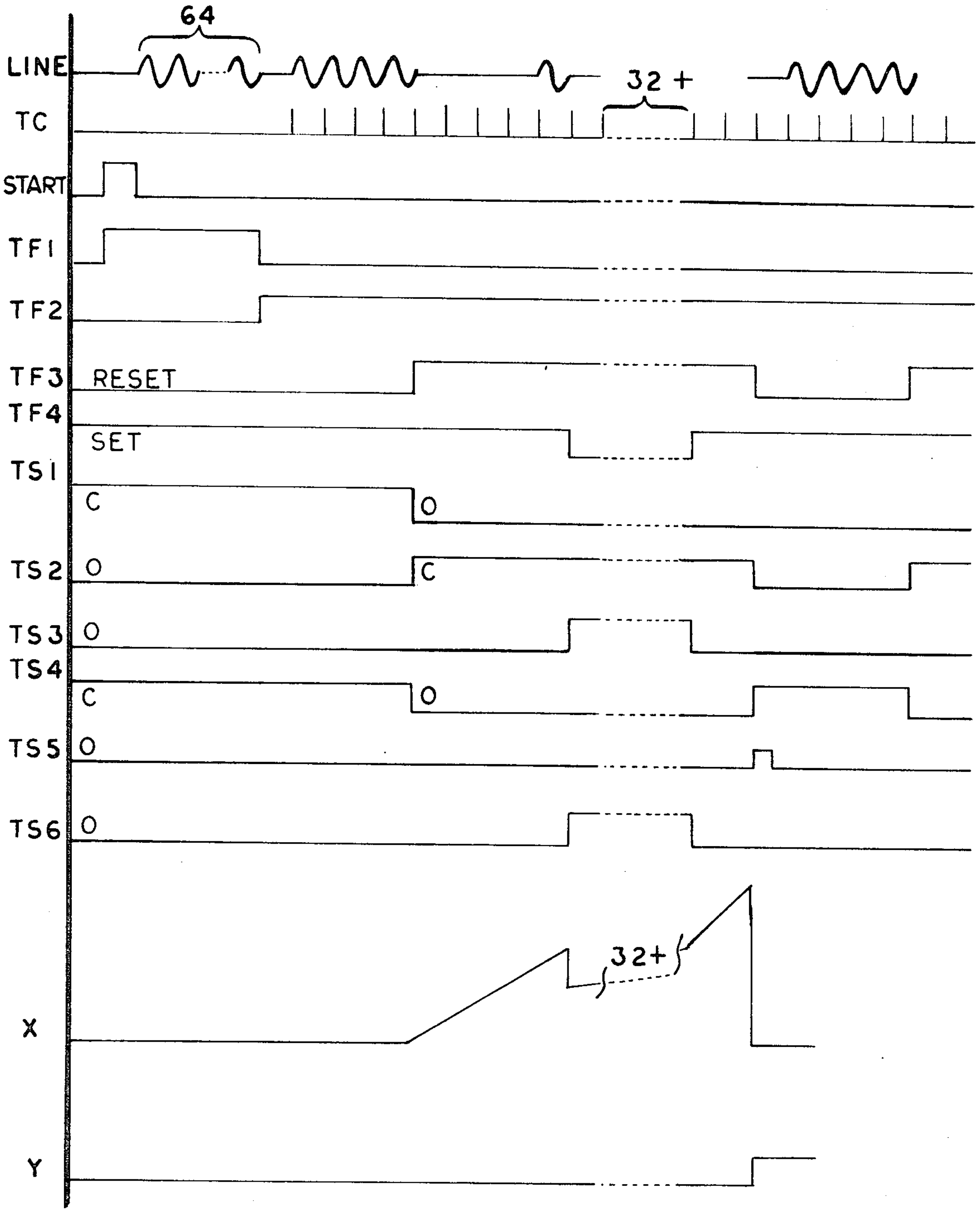
FIG. 3 is a composite graph of waveforms occurring in the apparatus of FIGS. 1 and 2, illustrating the mode of operation.

Operation of the transmitting apparatus in FIG. 2 will next be described in connection with FIGS. 2 and 3. In FIG. 3, the states of flip-flops are shown as two-level signals, the high level representing the flip-flop in its set state, and the low level representing the reset state. Similarly, the switch states are shown as a raised level for a closed switch and a lower level for an open switch. As indicated in FIG. 3, signals appearing on the transmission line are balanced, each logic 1 signal being represented as a full cycle of alternating current at the selected frequency of, for example, 3,000 cycles per second.

Initially, the apparatus will be assumed to be in the condition represented in FIG. 3. Referring to FIGS. 2 and 3, the flip-flop TF4 is initially set. The switches TS2, TS3, TS5 and TS6 are initially open. The switches TS1 and TS4 are initially closed. With the switch TS4 closed, the output of the horizontal sweep generator 18 is held at zero volts. The output of the vertical sweep generator 25 is also at zero volts at this time.

Assume that the start signal is now given by momentarily depressing the pushbutton PB in FIG. 2. The counter 23 will be reset to its zero state, if not already in that state. The flip-flop TF1 will be set, enabling the gate TG1 to supply pulses to the counter 13. Each such pulse is also applied through the OR-gate TG3 to the signal processing amplifier 7, to apply a single balanced pulse of alternating current to the line 2.

Stepping of the counter 13 will proceed until 64 pulses have been applied to the line. When that has been accomplished, the counter 13 will produce an output signal on the lead 14, resetting the flip-flop TF1 while setting the flip-flop TF2.

The gate TG2 will now be enabled to pass clock pulses TC. These pulses will be admitted through the closed switch TS1 to the OR-gate TG3 and thence to the amplifier 7 to produce pulses for application to the line.

At the same time, the counter 15 will be stepped. When four pulses have been applied to the line, the counter 15 will set the flip-flop TF3, closing the switch TS1. At the same time, the switch TS4 will be opened, and the switch TS2 will be closed.

With the switch TS6 open and the switch TS4 open, a fast horizontal scan will begin with the capacitor C2 charging in response to the input signal applied through the resistors R1 and R2 in series. As illustrated in FIG. 3, the horizontal deflection voltage X will thus rise at a rapid rate. That action will continue until either the end of the line is reached, or data is encountered. FIG. 3 illustrates the situation in which a video data pulse appears at the output of the amplifier A2 in the flying spot scanner. That pulse is applied through the switch TS2, the gate TG3 and the amplifier 7 to supply a cycle of alternating current to the line 2 and to the flip-flop TF5. The next clock pulse TC is passed through the gate TG5, to reset the flip-flop TF4 and the counter 17.

When the flip-flop TF4 is reset, the switch TS3 will be closed, permitting pulses TC to be supplied to the counter 17. At the same time, the switch TS6 will be closed, causing the sweep generator 18 to begin scanning at a slower rate. Simultaneously, the oscillator OS1 is triggered to offset the sweep voltage so that the slow scan cycle begins slightly behind the point at which the video data signal was encountered.

Slow scanning will continue at least until the counter 17 has reached the count of 32 in response to clock pulses TC applied through the switch TS3. At some point early in the slow scan, the data that was sensed in the rapid scan will be encountered, again resetting the counter 17. Should any video data be supplied through the switch TS2 during this new counting interval, the counter 17 will be reset and the count begun again. FIG. 3 illustrates the situation in which no such data, other than the original data pulse that started the slow scan, is encountered during the count of the counter 17, so that after the 32nd pulse TC in the second counting sequence, the flip-flop TF4 is set. That action causes the switch TS6 to be opened, and fast scan to resume.

When the full horizontal scan voltage has been reached, the comparator A3 will detect the end of the line and enable the gate TG4 to apply a clock pulse TC to trigger the oscillator OS2 and advance the vertical sweep generator 25 and the counter 23. At the same time, the flip-flop TF3 will be reset by the pulse A3P. The switch TS5 in the vertical generator 25 will be briefly closed by the one-shot OS2, causing the amplifier A4 to charge the capacitor C4 one line step and thereby raise the Y voltage to the next line position.

With the flip-flop TF3 reset, the switch TS2 will be closed to keep stray video out of the control circuits and off the line. At the same time, the switch TS1 will be closed to pass clock pulses TC to the counter 15 and to the gate TG3. A new cycle of four pulses will thus be produced at the end of the line, in a cycle that is terminated by the counter 15 when it sets the flip-flop TF3 at the fourth pulse. The next line scan will then begin in the same manner as for the one just described.

At the end of the 1,024th line scan, the counter 23 will produce the output signal ENDT, restoring the vertical sweep signal to zero. At the same time, the signal ENDT will reset the flip-flop TF2 and restore the apparatus to its initial condition.

Figure 4:
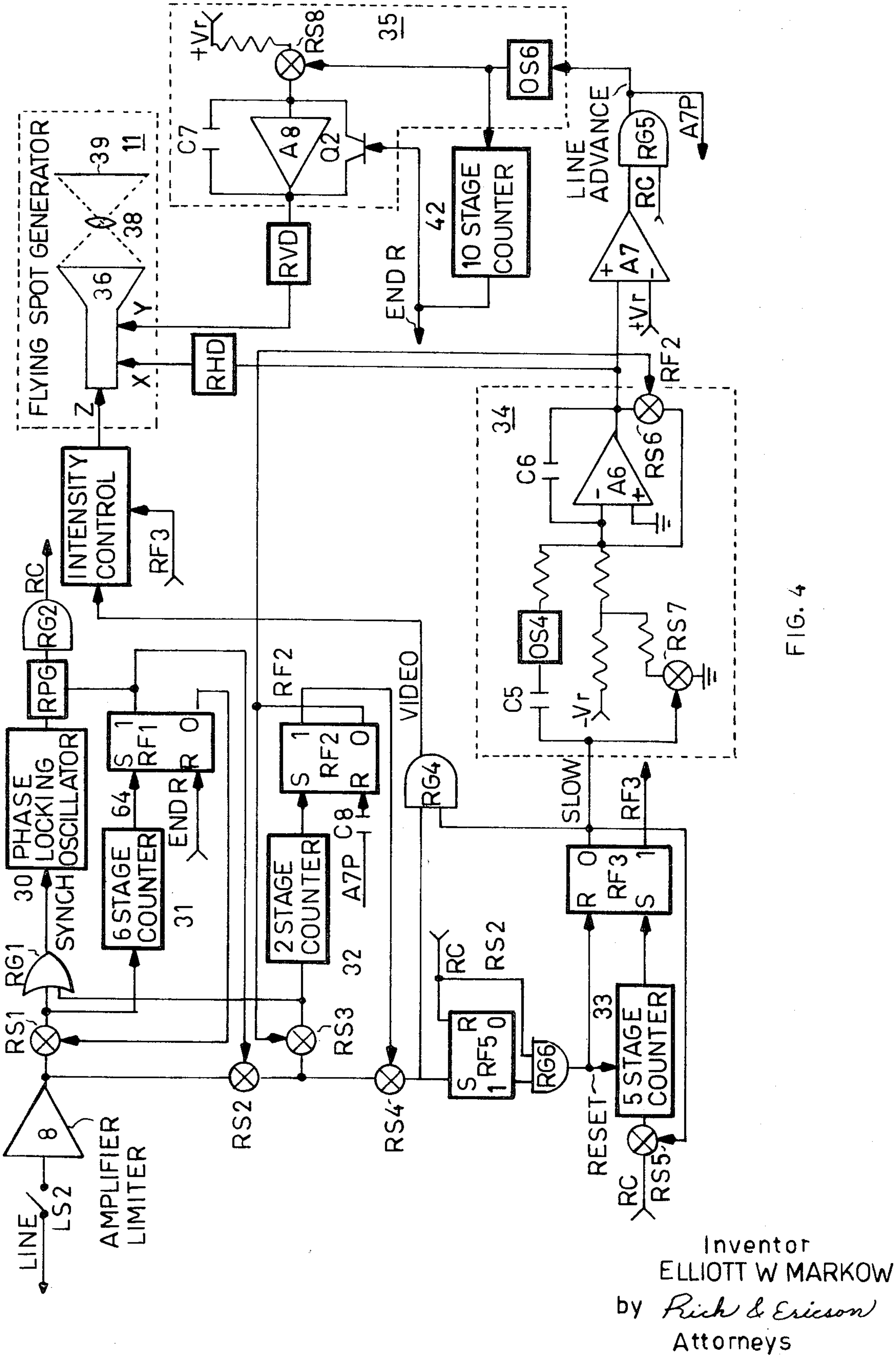
FIG. 4 is a schematic wiring diagram of a receiver forming a part of the apparatus in FIG. 1.

Referring now to FIG. 4, the circuits comprising the facsimile receiver of my invention will next be described. As noted above, the transmission line 2 is connected to the receiver through switching circuits, conventionally telephone switching circuits, indicated schematically by the line switch LS2. Incoming line signals are applied to the amplifier-limiter 8, where they are converted to standard digital pulses in a conventional manner that will be familiar to those skilled in the art.

Output signals from the amplifier 8 are applied through an electronic switch RS1 to one input terminal of an OR-gate RG1. The switch RS1 is closed when a flip-flop RF1 is in its reset state. Pulses produced by the OR-gate RG1 are applied to a phase locking oscillator 30.

The phase locking oscillator 30 may be of any conventional design, and may for example be a retriggerable astable multivibrator having a frequency equal to the frequency of the oscillator 12 in FIG. 2. Essentially, the oscillator 30 comprises means for reproducing the frequency of the oscillator 12 in FIG. 2, together with synchronizing means for locking it in phase with the oscillator 12 in response to synchronization signals applied through the gate RG1.

Output signals from the oscillator 30 are supplied to a conventional pulse-generating network RPG, arranged to generate a clock pulse at the trailing edge of each oscillator output cycle. These pulses are applied to one input terminal of a conventional AND-gate RG2. The second input terminal of the gate RG2 is connected to the logic 1 output terminal of the flip-flop RF1. Accordingly, when the flip-flop RF1 is set, the gate RG2 is enabled to produce clock pulses labeled RC.

Pulses admitted through the switch RS1 are also applied to the input terminal of a conventional six-stage counter 31. The counter 31 may be any conventional binary counter arranged to produce an output pulse when 64 input pulses have been applied to its input terminal. When that pulse is produced, it sets the flip-flop RF1. When set, the flip-flop RF1 opens the switch RS1 and enables the gate RG2. The flip-flop RF1 is arranged to be reset by a signal ENDR produced at the end of the reception of a full page of copy in a manner to be described below.

When set, the flip-flop RF1 closes a switch RS2 to admit signals from the line amplifier 8 to the other circuits in FIG. 4. When a switch RS3 is closed, signals admitted by the switch RS2 are supplied to a two-stage counter 32, and also through the OR-gate RG1 to the phase-locking oscillator 30.

The counter 32 produces an output pulse in response to four applied input pulses, thereby setting a flip-flop RF2. The logic 1 output terminal of the flip-flop RF2 is connected to the control terminal of an electronic switch RS4, and the logic zero output terminal of the flip-flop RF2 is connected to the control terminal of the switch RS3. The logic zero output terminal of the flip-flop RF2 is also connected to the control terminal of a switch RS6. As will appear, at the beginning of each line scanned, the flip-flop RF2 is reset, and thus closes the switch RS3 while four pulses are admitted to the counter 32. The flip-flop RF2 is then reset, opening the switches RS3 and RS6 and closing the switch RS4.

When the switch RS4 is closed, signals are admitted to one input terminal of a conventional AND-gate RG4, to the reset terminal of a flip-flop RF3, and to the set input terminal of a flip-flop RF4. The logic one output terminal of the flip-flop RF4 is connected to one input terminal of a two input terminal AND-gate RG6. The second input terminal of the gate RG6, and the reset terminal of the flip-flop RF4, are connected to receive the clock pulses RC.

The output terminal of the gate RG6 is connected to a reset terminal of a five-stage counter 33 which serves to reset all stages of the counter to the zero state. The counter 33 and flip-flop RF3 form part of a scan speed control circuit.

An electronic switch RS5 is connected between a terminal on which the gate clock pulses RC appear and the input terminal of the counter 33. When closed, the switch RS5 admits clock pulses RC to step the counter 33. When 32 stepping pulses have been applied, the counter produces an output pulse that sets the flip-flop RF3.

The control terminal of the switch RS5 is connected to the logic zero output terminal of the flip-flop RF3, to be closed when the flip-flop is reset, and opened when it is set. When the flip-flop RF3 is reset, it also enables the gate RG4 to pass pulses applied through the switch RS4.

The logic zero output terminal of the flip-flop RF3 is connected to the speed control input terminal of a horizontal sweep generator 34. The sweep generator 34 may be identical in every respect to the horizontal sweep generator 18 described in connection with FIG. 2, and is shown in full merely to facilitate following the operation of the apparatus. Since it is identical with the sweep generator 18, it will not be described in detail.

Briefly, however, when the switch RS7 is closed in the reset state of the flip-flop RF3, the sweep generator 34 will produce a slowly rising sweep voltage. When the switch RS7 is open, in the set state of the flip-flop RF3, a rapidly rising sweep voltage will be generated. When the switch RS6 is closed, the output of the sweep generator 34 will be held at ground, and when that switch is open it will rise at a rate determined by the state of the switch RS7.

The output of the sweep generator 34 is connected to the noninverting terminal of an operational amplifier A7. The inverting input terminal of the amplifier A7 is connected to receive the reference voltage +Vr. The amplifier A7 serves as a comparator in exactly the manner described for the comparator amplifier A3 in FIG. 2, and produces an output signal enabling an AND-gate RG5 at the end of each horizontal sweep. When the gate RG5 is enabled, it passes a clock pulse RC to trigger a one-shot multivibrator OS6 in a vertical sweep generator 35, and produces a pulse A7P that serves to reset the flip-flop RF2.

The vertical sweep generator 35 may be identical in every respect with the vertical sweep generator 25 described in connection with FIG. 2, and so it will not be described in detail. In brief, each time the oscillator OS6 is triggered, the switch RS5 is closed for a fixed time to supply a standard pulse to the amplifier A8, stepping the sweep voltage to the next vertical line position. At the same time, a 10-stage counter 42 is stepped to keep track of the vertical line position. At the 1,024th pulse applied to the counter 42, a pulse ENDR is produced to reset the vertical sweep generator to zero and to reset the flip-flop RF1. The sweep generator 35 is reset by biasing a field-effect transistor Q2 into conduction, as in the transmitter.

The output of the horizontal sweep generator 34 is applied through conventional deflection circuits RHD to supply the horizontal deflection signal X to a cathode-ray tube 36 forming a portion of a flying spot recorder 11. Similarly, the output signal from the vertical sweep generator 35 is applied to conventional vertical deflection circuits RVD, to produce the vertical deflection signal Y for the cathode-ray tube 36. The intensity control signal Z for the cathode-ray tube 36 is produced by conventional intensity control circuits 37 in response to video signals supplied by the gate RG4, or to a blanking signal RF3 produced when the flip-flop RF3 is set.

Figure 5:
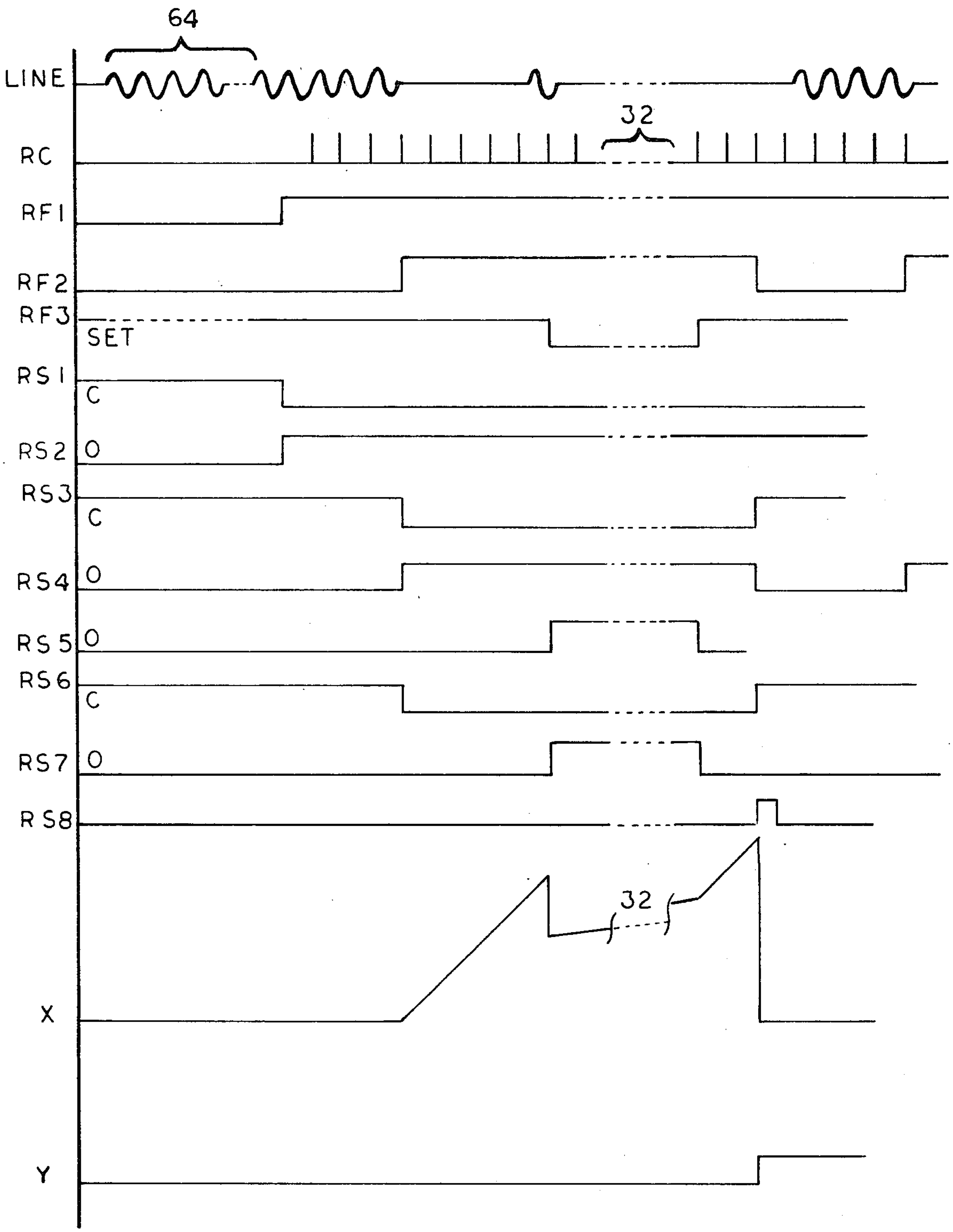
FIG. 5 is a composite graph illustrating waveforms occurring in the operation of the receiver of FIG. 4.

Operation of the receiving apparatus in FIG. 4 will next be described in connection with FIGS. 4 and 5. The line signal sequence shown in FIG. 5 is the same as that shown in FIG. 3.

Initially, when the receiver is awaiting a transmission, the flip-flops RF1 and RF2 are reset, and the flip-flop RF3 is set. The switches RS1, RS3 and RS6 are closed, and the switches RS2, RS4, RS5 and RS7 are open. The beginning of a transmission is signalled by the receipt of 64 pulses on the line 2, which pulses are transmitted to the amplifier 8 over the closed switch LS2 and transformed into digital pulses corresponding to the trailing edge of each full cycle of a line signal.

With the switch RS1 closed, the counter 31 will begin to step and the phase-locking oscillator 30 will be adjusted into synchronism with the transmitter oscillator. When the 64th pulse is received, the counter 31 will set the flip-flop RF1 and thereby open the switch RS1, enable the gate RG2, and close the switch RS2. The gate RG2 will now produce the receiver clocking pulses RC.

Following the initial synchronizing sequence of 64 pulses, the transmitter will produce four line synchronizing pulses that will be applied through the switches RS2 and RS3 to step the counter 32. When the fourth pulse is received, the flip-flop RF2 will be set and thereby open the switch RS3 and close the switch RS4.

With the flip-flop RS2 set, the switch RS6 will be opened to permit the horizontal sweep generator 34 to begin a rapid scan, as illustrated by the rapidly rising voltage X in FIG. 5. This scan will continue until either the end of the scan is reached, as sensed by the comparator amplifier A7, or until a video data pulse is encountered on the line. As illustrated in FIG. 5, when such a pulse is encountered, the flip-flop RF3 in FIG. 4 will be reset, causing the switches RS5 and RS7 to be closed.

The same pulse that reset the flip-flop RF3 applies a reset pulse to the counter 33, so that if it was not in the zero state, it would be set to zero. Clock pulses RC will now be admitted to the counter 33 through the switch RS5. In the meantime, a slow scan in the receiver will begin, starting at a lower voltage than the end of the fast scan because of the offset introduced by the one-shot multivibrator OS4. At some point during this slow scan, the original data that caused the video pulse during the fast scan will be encountered, resulting in a video pulse applied through the switches RS2 and RS4 and the gate RG4 to the intensity control circuits 37. Any other video data occurring during this slow scan will also be supplied to the intensity control circuits to cause a corresponding writing operation in the flying spot recorder 11.

Thirty-two counts after the last video data encountered during the slow scan, the counter 33 will set the flip-flop RF3 and open the switches RS5 and RS7. A fast scan will accordingly begin. The fast scan will continue until the end of the line, if no video data is encountered. When the end of the line is reached, the amplifier A7 will respond and enable the gate RG5 to produce a pulse advancing the vertical sweep generator 35 and resetting the flip-flop RF2. The flip-flop RF2 will remain reset until four new line pulses are encountered, whereupon scanning will begin again.

Figure 6:
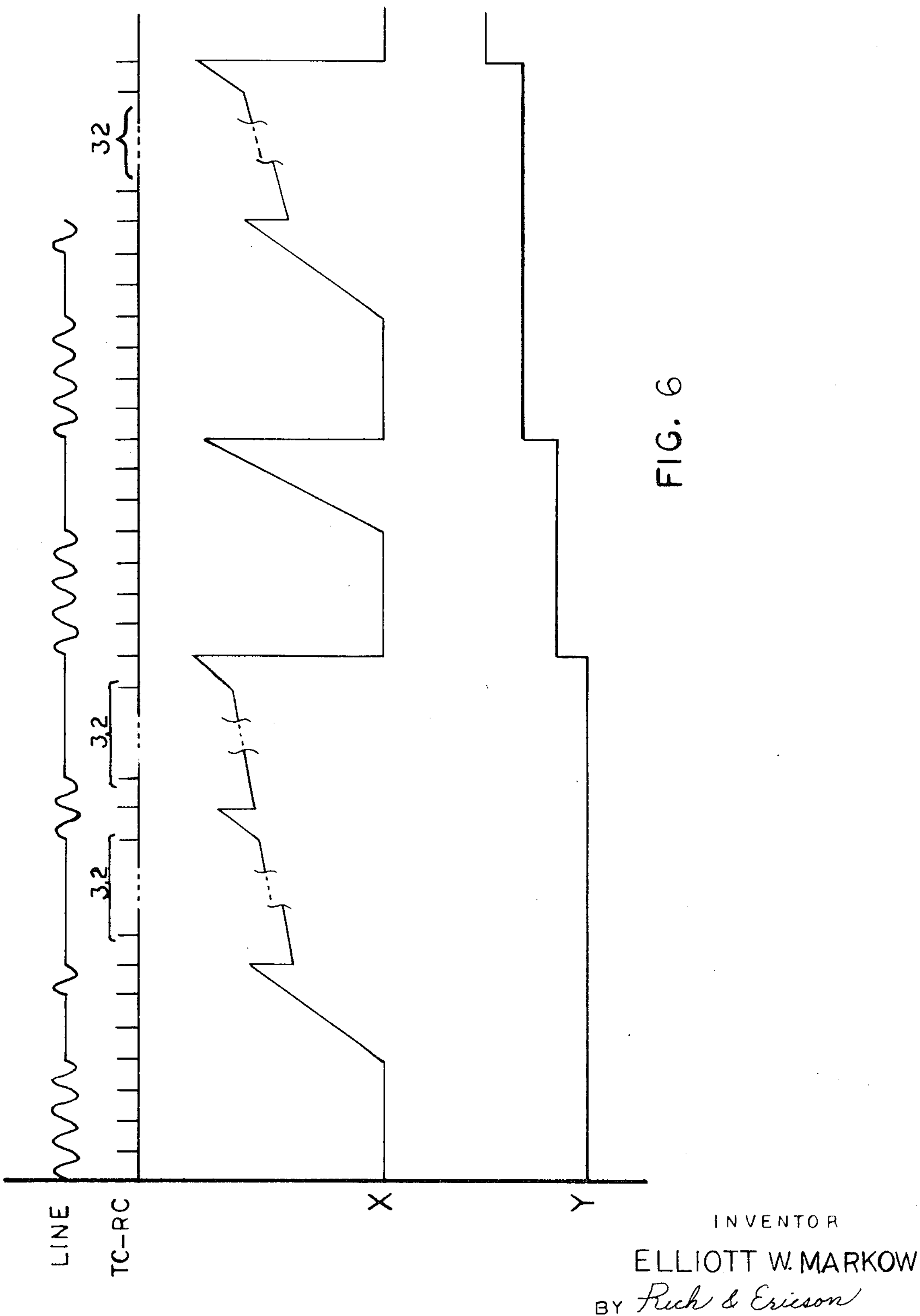
FIG. 6 is a composite graph showing waveforms occurring in the operation of the system of FIGS. 1, 2 and 4.

Overall operation of the transmitter and receiver for several line scans is illustrated generally in FIG. 6. Transmitter and receiver clocks are shown on the same line as TC-RC. In practice, they will be separated by a phase difference depending on the transmission line characteristics, but because of the mode of synchronization employed, that difference is constant and therefore does not affect the operation of the receiver.

It will be apparent that the transmitter and receiver will scan at the slow rate essentially continuously, except for the line synchronization pulses and short intervals required to detect data, at the beginning of each line, as long as information is detected on the copy during the scan. In any particular scan, the last data encountered will be followed by a minimum of 32 cycles of slow scan. Since it is desired to have the same resolution capability in horizontal recording as in vertical recording, the number of cycles in each horizontal scan should be in the same proportion to the number of vertical lines as the page width is to its length. Thus, for an 8×10 inch copy format, if the copy is scanned in 1,024 vertical lines, there are preferably about 800 cycles in a horizontal scan. The minimum delay time following the detection of data, here selected as 32 cycles, is thus 32–800ths of a line, or a rather small portion of the horizontal scan. While that fraction can obviously be adjusted as desired by selecting the number of stages of the counters 17 in FIG. 2 and 33 in FIG. 4, it represents a convenient value from the standpoint of minimizing false returns to slow scan while taking advantage of relatively small blank areas on the copy to speed transmission. Thus, completely blank lines are scanned very rapidly, with no interruption, while lines with only a few characters are still scanned quite rapidly in comparison with the scanning of a line that is full of characters. The apparatus is particularly efficient in the presence of slight misalignment in the copy in the transmitter, which would cause typed copy in conventional facsimile apparatus to be interpreted as solidly packed with information.

While I have described the apparatus of my invention with respect to the details of the preferred embodiment, many changes and variations will occur to those skilled in the art upon reading my description, and such can obviously be made without departing from the scope of my invention.

Having thus described my invention, what I claim is:

1. In a facsimile system for scanning a data-bearing medium on a line-by-line basis for reproducing and recording data, the combination, comprising:

means for scanning said medium at a high rate until data is detected;

means responsive to said detected data causing said medium scanner to retrace to a point a selected constant distance just before the point at which said detected data was detected in a line, not normally to the end of said line, to rescan said line of said medium at a slower rate, and to continue to scan said line for a predetermined time after data is no longer detected;

means responsive after said predetermined time to the presence of no data causing said medium scanner to resume said high rate scan until data is next detected; and means for processing detected data during said lower rate scan periods.

2. The apparatus of claim 1, in which said processing means comprises a transmitter for transmitting detected data during said lower rate scan periods.

3. The apparatus of claim 1, in which said processing means comprises a receiver for receiving said detected data during said lower rate scan periods.

4. In a facsimile system for scanning a record member on which data is recorded and reproducing the recorded data, a facsimile scanner which comprises means for scanning the record member at a high rate to produce a video signal, on a line-by-line basis means for detecting data in said signal, means responsive to said detected data causing said facsimile scanner to retrace to a point a selected constant distance just before the point at which said data was detected in said line, not normally to the end of said line and to reinstitute scanning of said data at a lower rate and to continue scanning said medium for a predetermined time after data is no longer detected in said line and then resuming the high rate scan until data is next detected, in a line and means for transmitting the data detected during the slow scan periods.

5. In a facsimile system for scanning a record member on a line-by-line basis and recording data on said member in response to a video signal propagated at a first rate, means for supplying a video signal containing intervals in which data occur interspersed by intervals in which data do not occur, means for detecting data in said video signal, recording scanning means which comprises means responsive to said detecting means for scanning said record member at a second rate higher than said first rate in the absence of detected data and causing said scanning means to retrace to a point a selected constant distance just be fore the point at which said data was detected, not necessarily to the end of a line and to reinstitute scanning of said member at said first rate and to continue scanning said medium for a predetermined time after data is no longer detected and then resuming the high rate scan until data is next detected.

6. In a facsimile system, a transmitter comprising:

a document scanner for producing a video transmission signal in accordance with data recorded on a document to be scanned, on a line-by-line basis said scanner comprising first deflection signal generating means for selecting a line on a document to be scanned, second deflection signal generating means for scanning a line selected by said first deflection signal generating means, means for producing a video signal determined by the position of said deflection signals, the rate at which said second deflection signal to a point a selected constant distance is generated, and the data recorded in said document at the location selected by said deflection signals, means for detecting data in said video signal, means controlled by said detecting means for rapidly changing said second deflection signal until data id detected, means controlled by said detecting means for retracing said second deflection signal behind the point where data was detected when data is detected, not necessarily to the end of the line, means to rescan said data, and means controlled by said detecting signal for a predetermined period after data is last detected or until the end of the line under scan is reached.

7. In a facsimile system, a transmitter adapted to cooperate with a recording receiver by means of a video transmission signal, said system comprising dual rate scanning means for producing a video data signal at a rate determined by the rate of change of an applied scanning signal, on a line-by-line basis means for detecting data in said scanning signal, means for actuating said scanning means to produce a rapidly changing video signal until data is detected, and video transmission signal generating means responsive to said data-detecting means causing said scanning means to apply a slowly changing scanning signal to said scanning means when data is detected beginning at a scanning point a selected constant distance behind which the data was detected, not necessarily to the end of the line.

8. A facsimile system, for line-by-line scanning comprising:

a transmitter having an output terminal, a receiver having an input terminal, a transmission line, and switching means for connecting said output terminal to said input terminal over said transmission line, said transmitter comprising scanning means responsive to two applied deflection signals to produce a video signal containing information corresponding to information in a scanned region to be reproduced, said receiver comprising recording means responsive to an applied video signal and two applied deflection signals for recording the applied video signal on a record member, in which said transmitter and said receiver each comprise a first deflection signal generator for scanning a line on said record member and an associated second deflection signal generator for selecting a line on said record member to be scanned, said first signal generator being settable to first and second stages and producing a first deflection signal that varies from a first value to a second value at a first rate in said first state and at a second rate in said second state, said second deflection signal generator comprising means responsive to a series of applied stepping signals for producing a second deflection signal corresponding to the sum of said stepping signals, means controlled by each first deflection signal generating means at the end of a line scan for applying a stepping signal to the associated second deflection signal generator, timing means controlled by said scanning means for setting said first signal generating means to their second states for a predetermined time following the occurrence of information in said video signal and then resetting said first signal generating means to their first states, and means in said transmitter and in said receiver for applying the deflection signals produced by the deflection signal generator therein to said scanning means and said recording means, respectively, in which each of said first deflection signal generating means comprises means effective when the signal generating means is set to its second state for offsetting the first deflection signals to a point a selected constant distance behind the point at which the information in the video signal caused said timing means to set the generating means to their second state produce a partial retrace.

* * * * *